Aug. 9, 1938.　　　F. L. MAIN　　　2,126,685
BRAKE MECHANISM
Filed March 23, 1936　　　2 Sheets-Sheet 1
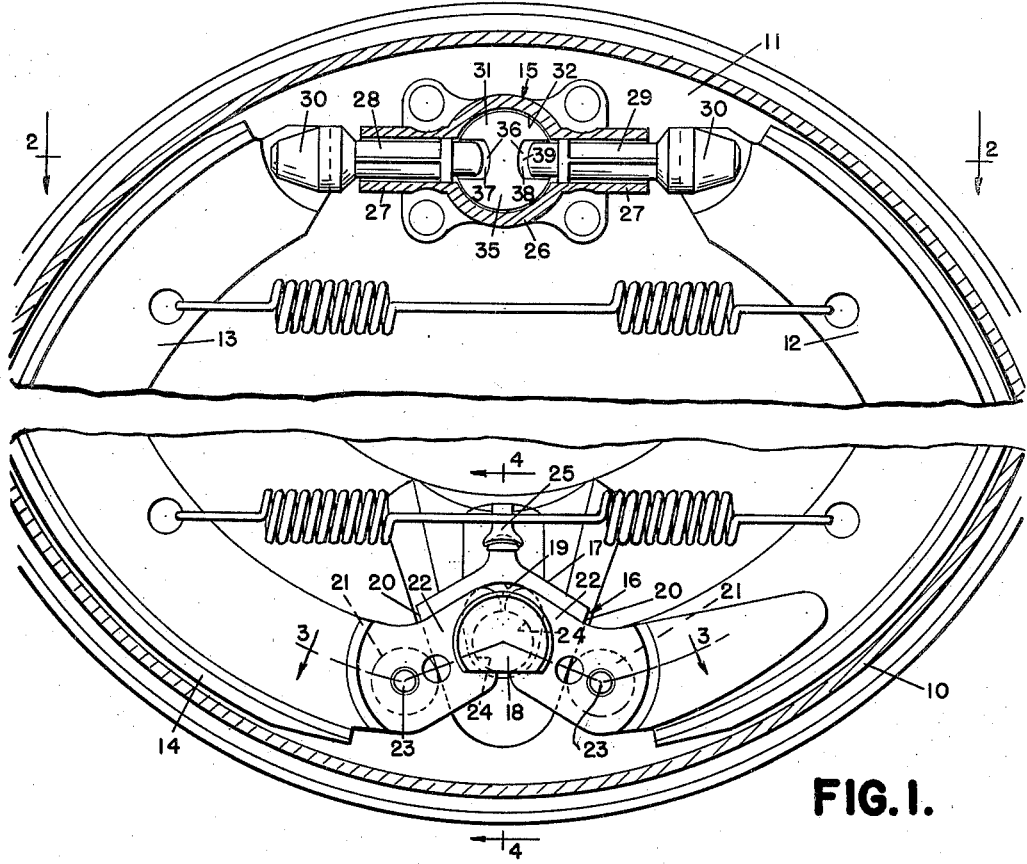
FIG. I.
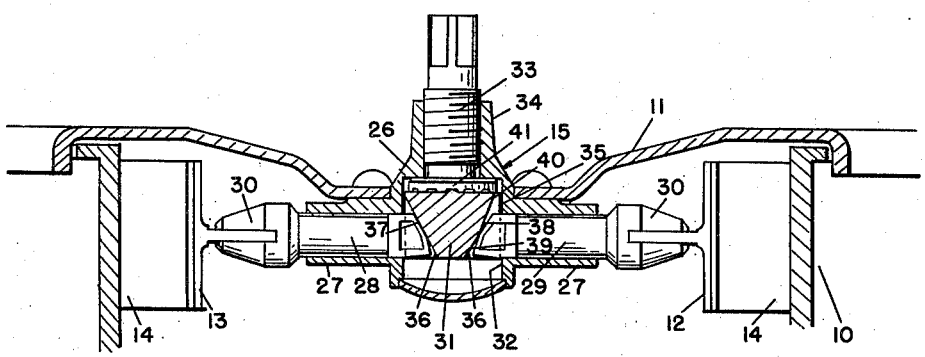
FIG. 2.
INVENTOR
FRANK L. MAIN
BY
ATTORNEYS Aug. 9, 1938.                F. L. MAIN                 2,126,685
                           BRAKE MECHANISM
                   Filed March 23, 1936      2 Sheets-Sheet 2
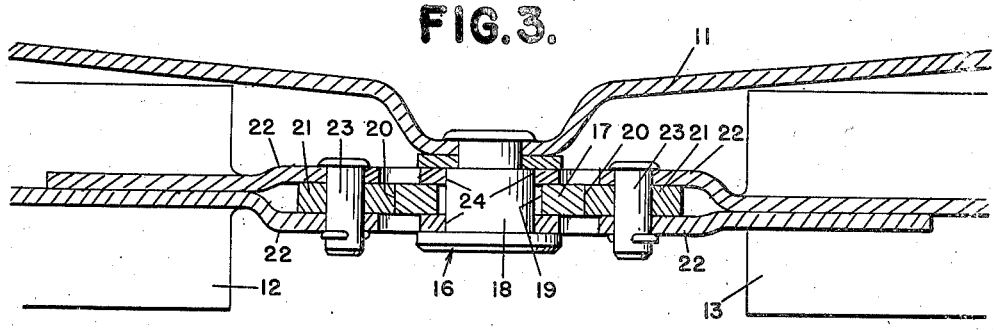
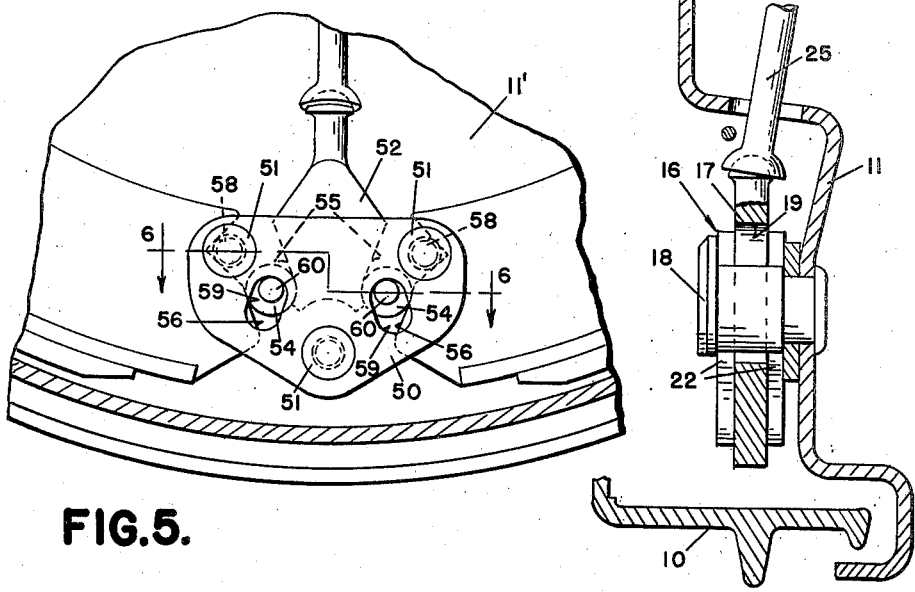
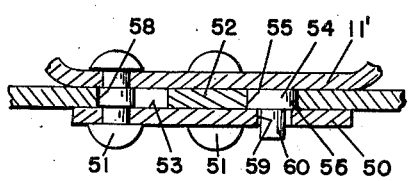
INVENTOR
FRANK L. MAIN
BY *Whittemore Hulbert Whittemore Belknap*
ATTORNEYS Patented Aug. 9, 1938

2,126,685

UNITED STATES PATENT OFFICE 2,126,685

BRAKE MECHANISM

Frank L. Main, Birmingham, Mich., assignor to Kelsey-Hayes Wheel Company, Detroit, Mich., a corporation of Delaware Application March 23, 1936, Serial No. 70,431

14 Claims. (Cl. 188—79.5)

This invention relates generally to vehicle brakes and refers more particularly to improvements in brake mechanism.

It has been customary in brakes commonly known as the "two shoe" type to interpose actuating means between one end of the shoes and to provide adjustment means between the opposite ends of the shoes for maintaining a minimum clearance between the shoes and associated brake flange. It has also been customary in brakes of the above character to provide rollers at the actuator ends of the shoes for engagement with opposite sides of a radially movable wedge to expand the shoes into engagement with the brake flange and in addition, to provide an anchor pin between the actuator ends of the shoes about which the latter pivot independently of each other in response to adjustment at the opposite ends of the shoes.

Owing to the fact that in constructions of the character briefly outlined above, the actuator ends of the shoes engaging the wedge stud usually extend inwardly beyond the rollers, it follows that outward swinging of the shoes about the axis of the wedge stud by the adjusting mechanism effects a displacement of the rollers in a direction away from the wedge. This action is objectionable in that it necessitates carefully taking up the pull rods associated with the brake after each adjusting operation and it is one of the principal objects of the present invention to overcome this objection by so locating the wedge stud with respect to the rollers that the latter swing in response to adjustment of the shoes toward the brake flange around the axis of the wedge stud substantially parallel to the opposite cam faces on the wedge, with the result that the rollers remain in contact with these cam faces during the adjustment.

The foregoing, as well as other objects, will be made more apparent as this description proceeds, especially when considered in connection with the accompanying drawings, wherein:

Figure 1 is a side elevational view, partly in section, of brake mechanism constructed in accordance with this invention;

Figure 2 is a sectional view taken substantially on the plane indicated by the line 2—2 of Figure 1;

Figure 3 is a sectional view taken substantially on the plane indicated by the line 3—3 of Figure 1;

Figure 4 is a sectional view taken substantially on the plane indicated by the line 4—4 of Figure 1;

Figure 5 is a fragmentary side elevational view of a slightly modified form of construction; and Figure 6 is a sectional view taken substantially on the plane indicated by the line 6—6 of Figure 5.

The brake mechanism illustrated in Figures 1 to 4 inclusive comprises a brake drum 10, a backing plate 11 and a pair of brake shoes 12 and 13 supported within the drum in a manner to be presently described. The brake shoes are substantially T-shaped in cross section with the head of the T located adjacent the brake flange and having a friction lining 14 secured to the exterior surface thereof for engagement with the brake flange.

Upon reference to Figure 1, it will be noted that the brake shoes have spaced ends anchored upon the backing plate 11 through the medium of an adjusting device 15 and in addition, have the opposite ends spaced from each other for engagement by a suitable actuator 16 adapted to force the shoes into frictional engagement with the brake flange. In the illustrative embodiment of the invention, the upper ends of the shoes are adapted to be anchored on the backing plate 11 and the lower ends thereof are engageable by the actuator.

The actuator 16 comprises a wedge 17 supported for radial movement relative to the shoe ends by means of a stud 18 secured to the backing plate and extending through an opening 19 in the body portion of the wedge. The opening 19 has a peripheral dimension greater than the diameter of the portion of the stud extending therethrough so as to provide sufficient clearance to enable the wedge to adjust itself to the shoes in the event they move unequal extents upon being forced into frictional engagement with the brake flange. In other words, the arrangement is such as to permit the wedge 17 to float to a certain extent and this provides for obtaining the desired circumferential displacement of the shoes. It will be observed from Figure 1 that the opposite edges of the wedge diverge upwardly to provide the cam faces 20 and the latter engage suitable rollers 21 respectively carried by the shoes at points spaced from the lower ends thereof.

It will also be observed from Figure 1 that the extremities of the lower ends of the shoes abut the stud 18 when the brake is in its released position and that the shoes pivot about the axis of the stud 18 upon actuation of the adjusting device 15 to move the shoe toward the brake flange. It has been previously stated that the present invention contemplates so locating the stud 18 with respect to the rollers 21 that when the shoes are swung outwardly about the axis of the stud, the rollers move substantially parallel to the cam faces 20 on the wedge 17. This is accomplished by locating the stud 18 in a position where the axis thereof is spaced a substantial distance about the axes of the rollers 21 and the extremities of the lower ends of the shoes beyond the rollers are offset upwardly to abut the stud. The construction is such that swinging movement of the shoes outwardly about the axis of the stud by the adjusting device 15 effects a displacement of the rollers substantially along the cam faces 20 of the wedge instead of away from these cam faces, as is the case in conventional practice.

Referring now more in detail to the particular construction illustrated and with special reference to Figure 3, it will be noted that the lower end of each shoe is provided with a pair of laterally spaced extensions 22. As will be observed, one extension is formed by laterally offsetting the lower end of the web or stem of each shoe and the other extension is in the form of a plate fixedly secured as by welding to the web or stem of the shoe. The rollers 21 are located between the extensions and are journalled upon the pins 23 extending through the extensions. The free ends of the extensions are formed with concave seats 24 for engaging the opposite sides of the stud 18 in the released position of the brake mechanism. Attention is also called to the fact that the wedge 17 is adapted to extend between the pairs of extensions on the lower ends of the shoes for radial movement relative thereto and in the present instance, this wedge is actuated by a suitable push rod 25 engageable with the upper end of the wedge.

The adjusting device 15 serves to anchor the shoe upon the backing plate and this device may be of any construction suitable for varying the clearance between the shoes and brake flange. However, for the purpose of illustration, I have selected the following construction of adjusting device, since the latter has been found satisfactory to cooperate with the actuator in permitting circumferential and radial displacement of the shoes. The specific construction of the adjusting device 15 is shown in my copending application, Serial #68,332 filed March 11, 1936, and accordingly, will not be described in detail herein. Briefly, the adjusting device 15 comprises an anchor bracket 26 fixedly secured to the backing plate and having coaxially arranged tubular portions 27 extending into the drum and slidably receiving the links 28 and 29. The adjustment links have at their outer ends, suitable heads 30 which are slotted to receive the upper ends of the webs of the brake shoes in such a manner that the ends of the webs abut the bottom portions of the slots.

For adjusting the links, I have provided a wedge 31 located in a bore 32 in the anchor bracket between the inner end portions of the adjusting links and adapted to be axially or longitudinally adjusted by means of a screw 33 threaded in a tubular portion 34 of the anchor bracket extending at right angles to the tubular portions 27. The wedge has a cylindrical body portion 35 and the diametrically opposed grooves 36 for loosely receiving the inner flattened end portions of the adjusting links. These grooves have the bottoms 37 and 38 which are inclined relative to the axis of the wedge and which are engageable with the inner ends of the adjustment links. The bottom 38 has the lower end portion 39 inclined at the same angle as the bottom 37 and the upper end portion 40 inclined at a smaller angle. The arrangement is such that when the ends of the adjutment links engage the lower end portion of the wedge, both brake shoes are correspondingly positioned relative to the adjustment anchor device and their friction linings may be properly ground. This grinding operation is performed during the manufacture and prior to the assembly with the brake drum and backing plate. However, after assembly, axial inward adjustment of the wedge positions the latter so that the adjustment links engage the outer portions of the bottoms of the grooves and the adjustment link 29, for the secondary shoe 12, engages the portion 40 of the bottom 38. It necessarily follows, therefore, that axial adjustment of the wedge advances the adjustment link 28 for the primary shoe at a greater rate than the adjustment link 29 for the secondary shoe. The angle of the bottom 37 and the portion 40 of the bottom 38 are predetermined in accordance with the approximate rate of wear of the friction linings of the primary and secondary shoes so that adjustment of the anchor device compensates for the wear and provides equal clearance between the shoes and the drum. Attention is also called to the fact that the inner end of the link 29 for the secondary shoe is provided with angular surfaces complementary to the angularly arranged portions 39 and 40 of the bottom 38 so that the change of rate will be effected gradually.

The screw 33 has at its inner end, the flat head 41 which is of approximately the same diameter as the wedge 31 and which is engageable with this wedge to lock the screw from accidental turning and also to indicate predetermined increments of adjustment. In this connection, it will be noted that the outer surface of the wedge and the inner surface of the flat head are formed with cooperating projections and recesses which are adapted to cam over each other upon rotation of the screw 33 and, in this manner, indicates the increments of adjustment.

It has been previously stated that the wedge 31 is located within the cylindrical bore 32 in the anchor bracket and in the present instance, the diameter of this bore is slightly greater than the diameter of the cylindrical body of the wedge so as to provide sufficient clearance between the bracket and wedge for the latter to move in a general circumferential direction relative to the bracket. This construction provides for obtaining a controlled servo action, since it permits the transmission of a limited amount of torque from one shoe to the other.

The embodiment of the invention shown in Figures 5 and 6 illustrates another form of construction rendering it possible to adjust the shoes outwardly toward the brake flange without effecting displacement of the rollers away from the actuating wedge. In this embodiment of the invention, a plate 50 is secured to the backing plate 11' in spaced relation to the latter by means of shouldered rivets 51 and the actuating wedge 52 is mounted for radial sliding movement in the space 53 provided between the plate 50 and the backing plate 11'. In this construction, the wedge 52 merely floats between the two aforesaid plates and imparts motion to the lower ends of the shoes through the medium of rollers 54 also slidably supported between the plates for engagement with the opposite upwardly diverging cam faces 55 on the wedge.

As shown in Figure 5, the lower extremities of the shoes are provided with cam faces 56 inclined at an angle substantially corresponding to the cam faces 55 on the wedge and also engaging the rollers. The construction is such that when the wedge is moved radially outwardly, the cam faces 55 force the rollers outwardly into engagement with the cam faces 56 on the lower ends of the shoes and transmit this outward movement to the shoes.

The lower ends of the shoes are positioned, when the brake mechanism is released, by the two upper rivets 51 serving to secure the plate 50 to the backing plate 11'. In this connection, it will be noted that the lower extremities of the shoes extend between these two plates and are notched as at 58 above the cam faces 56 for receiving the upper rivets 51. Thus, it will be apparent that when the brake shoes are adjusted outwardly toward the brake flange, the same pivot about the axes of the rivets 51 and as the shoes are pivoted in this direction about the upper rivets 51, the cam faces 56 move toward the wedge 52. This movement of the cam faces 56 urges the rollers 54 upwardly along the cam faces 55 of the wedge. This action of the rollers is permitted due to the fact that the same are floatably supported between the plates and in the present instance, are guided to a certain extent by means of slots 59, formed in the plate 50, and pins 60 extending axially from the rollers through the slots. With the above construction, it will be noted that friction is reduced to the minimum because the rollers are free and have a rolling engagement with both the wedge and shoe.

It will be understood that the same adjusting means defined with some particularity in connection with the first form of this invention may also be used in connection with the embodiment shown in Figures 5 and 6. It is also to be understood, however, that other forms of adjusting mechanism may be employed without departing from the spirit and scope of this invention.

What I claim as my invention is:

1. In a brake mechanism, the combination with a drum having an annular brake flange and shoes within the drum engageable with the brake flange, of an actuator for the shoes comprising a radially movable wedge located between the shoes adjacent one end of the latter, a roller carried by each shoe for engagement with opposite sides of the wedge, and adjustment means associated with the opposite ends of the shoes for moving the latter outwardly about a stud forming an abutment for the extremities of the shoes beyond the rollers and having the axis thereof predeterminedly located with respect to the axes of the rolls to effect a displacement of the latter substantially along the adjacent sides of the wedge during adjustment of the shoes in a direction toward the brake flange.

2. In a brake mechanism, the combination with a drum having an annular brake flange and shoes within the drum engageable with the brake flange, of an actuator for the shoes located between the shoes adjacent one end of the latter and comprising a radially movable wedge having the opposite sides inclined with respect to the path of travel of the wedge, a roller carried by each shoe in spaced relation to the latter ends and respectively engageable with the inclined sides of the wedge, and adjustment means associated with the opposite ends of the shoes for moving the latter about a stud forming an abutment for the extremities of the shoes beyond the rollers and having the axis thereof located at a point spaced inwardly of a plane passing through the axes of the rollers.

3. In a brake mechanism, the combination with a drum having an annular brake flange and shoes within the drum engageable with the brake flange, of a fixed member located between the shoes at one end of the latter and forming an abutment about which the latter ends of the shoes pivot, means on each shoe spaced from said ends circumferentially of the drum, a member movable radially between the aforesaid means and having portions of the opposite sides thereof engageable with said means to expand the shoes into engagement with the brake flange, and adjustment means associated with the opposite ends of the shoes for pivotally moving the latter about said abutment, said first named means and abutment being predeterminedly located with respect to each other to maintain said first mentioned means in engagement with the opposite side portions of the member during said pivotal movement of the shoes about the abutment in a direction toward the brake flange.

4. In a brake mechanism, the combination with a drum having an annular brake flange and shoes within the drum engageable with the brake flange, of a fixed member located between the shoes at one end of the latter and forming an abutment about which the latter ends of the shoes pivot, a roller on each shoe spaced circumferentially of the drum from said ends of the shoes, a wedge movable radially between the rollers and having inclined opposite side portions engageable with the rollers to expand the shoes into engagement with the brake flange upon movement of the wedge in one direction, and adjustment means associated with the opposite ends of the shoes for pivotally moving the latter about said abutment, the axes of the rollers being predeterminedly located with respect to the abutment member to maintain the rollers in contact with the inclined sides of the wedge during said pivotal movement of the shoes about the abutment in a direction toward the brake flange.

5. In a brake mechanism, the combination with a drum having an annular brake flange and shoes within the drum engageable with the brake flange, of an actuator for the shoes comprising a wedge movable radially between the shoes adjacent one end of the latter, means for transforming the radial movement of the wedge into a circumferential movement of the shoes, abutment means for the aforesaid ends of the shoes, and adjustment means associated with the opposite ends of the shoes for swinging the actuator ends of the shoes outwardly about the abutment means, said abutment means being so positioned with respect to the first named means as to maintain the latter in engagement with the wedge during said outward swinging movement of the shoes about the abutment means.

6. In a brake mechanism, the combination with a drum having an annular brake flange and shoes within the drum engageable with the brake flange, of an actuator for the shoes comprising a wedge movable radially between the shoes adjacent one end of the latter, a roller associated with each of the latter ends of the shoes and engageable with opposite sides of the wedge to move the shoes outwardly into engagement with the brake flange upon movement of the wedge in one direction, abutment means for the aforesaid ends of the shoes, and adjustment means associated with the opposite ends of the shoes for swinging the actuator ends of the shoes outwardly about the abutment means, said abutment means being located radially inwardly of the axes of the rolls to maintain the latter in engagement with opposite sides of the wedge during said outward swinging movement of the shoes about the abutment means.

7. In a brake mechanism, the combination with a drum having an annular brake flange and shoes within the drum engageable with the brake flange, of an actuator for the shoes comprising a wedge movable radially between the shoes adjacent one end of the latter, a roller associated with each of the latter ends of the shoes and engageable with opposite sides of the wedge to move the shoes outwardly into engagement with the brake flange upon movement of the wedge in one direction, abutment means for the aforesaid ends of the shoes located on opposite sides of the path of travel of the wedge, and adjustment means for swinging the shoes outwardly about the abutment means, the abutment means being predeterminedly located with respect to the rolls to maintain the latter in engagement with the wedge during adjustment.

8. In a brake mechanism, the combination with a drum having an annular brake flange and shoes within the drum engageable with the brake flange, of a pair of circumferentially spaced abutments located between the shoes at one end thereof and permitting outward swinging movement of the shoes about the same, a wedge mounted for radial movement between the abutments and having opposite inclined sides, adjustment means for swinging the shoes outwardly about the abutment means, and a roller engageable with each of said sides of the wedge and engageable with the adjacent ends of the shoes for moving the latter outwardly into engagement with the brake flange upon movement of the wedge in one direction, the rollers being predeterminedly located with respect to the abutments to maintain the rollers in engagement with the wedge during said outward movement of the shoes about the abutments.

9. In a brake mechanism, the combination with a drum having an annular brake flange, a backing plate for the drum and brake shoes located within the drum for engagement with the brake flange, of a plate secured to the backing plate in spaced relation to the latter by means of rivets spaced from each other circumferentially of the drum, the space between said plates being sufficient to receive adjacent ends of the shoes and the latter ends abutting the rivets for outward swinging movement about the axes of the rivets, actuating means for the shoes comprising a radially movable wedge located between the plates, and rollers floatably supported between opposite sides of the wedge and adjacent ends of the shoes for moving the shoes into engagement with the brake flange upon movement of the wedge in one direction.

10. In a brake mechanism, the combination with a drum having an annular brake flange, a backing plate for the drum and brake shoes located within the drum for engagement with the brake flange, of a plate secured to the backing plate in spaced relation to the latter by means of rivets spaced from each other circumferentially of the drum, the space between said plates being sufficient to receive adjacent ends of the shoes and the latter ends abutting the rivets for outward swinging movement about the axes of the rivets, adjustment means associated with the opposite ends of the shoes for swinging the latter outwardly about the rivets, actuating means for the shoes comprising a radially movable wedge located between the plates, and rollers floatably supported between opposite sides of the wedge and adjacent ends of the shoes for moving the shoes into engagement with the brake flange upon movement of the wedge in one direction, the axes of the rollers being positioned radially outwardly from the axes of the rivets to provide for maintaining the rollers in engagement with the wedge and shoes upon said swinging movement of the shoes outwardly about the axes of the rivets.

11. In a brake mechanism, the combination with a brake drum having an annular brake flange and shoes within the drum engageable within the brake flange, of a pair of circumferentially spaced abutments located between the shoes at one end thereof and permitting outward swinging movement of the shoes about the same, a wedge mounted for movement relative to the abutments and having opposite inclined sides, adjustment means for swinging the shoes about said abutments, and means engageable with the opposite inclined sides of the wedge and effective upon movement of said wedge in one direction to move the shoes outwardly into engagement with the brake drum, said last named means being predeterminedly located with respect to the abutments to maintain the same in engagement with the wedge during movement of the shoes about the abutments by the adjustment means.

12. In a brake mechanism, a brake drum, brake shoes located within the drum and having spaced ends, means located between the ends of the shoes at one side of the drum and abutting said ends, adjustment means located between the ends of the shoes at the opposite side of the drum and effective to move said shoes outwardly relative to the drum about the abutment means, and a wedge operatively associated with the abutment ends of the shoes and shiftable radially of the drum between the latter ends for moving said ends outwardly relative to said drum, said abutment means being predeterminedly located with respect to the points of operative engagement of the wedge with the adjacent ends of the shoes to maintain said operative engagement during outward movement of the shoes about the abutment ends by the adjustment means.

13. In a brake mechanism, a brake drum, brake shoes located within the drum and having spaced ends, means located between the ends of the shoes at one side of the drum and abutting said ends, adjustment means located between the shoes at the opposite side of the drum and effective to move said shoes outwardly relative to the drum about the abutment means, a wedge associated with the abutment ends of the shoes and shiftable radially of the brake drum between said ends, means at opposite sides of the wedge and engaged thereby to move the adjacent ends of the shoes outwardly relative to the brake drum upon radial shifting movement of the wedge in one direction, said last named means and abutment means being predeterminedly located with respect to each other to maintain the last named means in contact with the opposite side portions of the wedge during swinging movement of the shoes about the abutment means by the adjustment means.

14. In a brake mechanism, a brake drum, brake shoes located within the drum and having spaced ends, means located between the ends of the shoes at one side of the drum and abutting said ends, adjustment means located between the ends of the shoes at the opposite side of the drum and effective to move said shoes outwardly relative to the drum about the abutment means, a member mounted for radial movement between the abutment ends of the shoes, and means positioned radially outwardly from the abutment means between opposite sides of the member and the adjacent ends of the shoes for moving the shoes in engagement with the brake flange upon radial movement of the member in one direction.

FRANK L. MAIN.